United States Patent [19]

Gardikes et al.

[11] 4,371,648

[45] Feb. 1, 1983

[54] COMPOSITION CONTAINING FURFURYL ALCOHOL AND USE THEREOF IN FOUNDRY BINDERS

[75] Inventors: John J. Gardikes, Worthington; Young D. Kim, Columbus, both of Ohio

[73] Assignee: Ashland Oil, Inc., Ashland, Ky.

[21] Appl. No.: 148,887

[22] Filed: May 12, 1980

[51] Int. Cl.$^3$ .............................................. B28B 7/34
[52] U.S. Cl. ..................................... 523/144; 106/38.22; 106/38.6; 164/526; 523/145; 524/270; 525/509
[58] Field of Search ............... 260/DIG. 40, 104, 97.5; 106/123 TQ, 36.6, 38.7, 38.2; 525/509; 523/144, 145; 524/270

[56] References Cited

U.S. PATENT DOCUMENTS

| | | | |
|---|---|---|---|
| 1,975,246 | 10/1934 | Zwilgmeyer | 260/104 |
| 2,103,445 | 12/1937 | Borglin | 260/104 |
| 2,117,572 | 5/1938 | Rankin | 260/104 |
| 2,191,311 | 2/1940 | Borglin | 260/104 |
| 3,222,315 | 12/1965 | Singer | 260/39 |
| 3,247,556 | 4/1966 | Buell et al. | 260/39 |
| 3,312,650 | 4/1967 | Case et al. | 260/29.3 |
| 4,215,206 | 7/1980 | Hanesworth et al. | 525/441 |

FOREIGN PATENT DOCUMENTS 11762  8/1971  Australia .

*Primary Examiner*—Lorenzo B. Hayes
*Attorney, Agent, or Firm*—Pollock, Vande Sande & Priddy

[57] ABSTRACT

A composition containing furfuryl alcohol and an ester of a polyol and resin acid; and use thereof in foundry binders.

23 Claims, No Drawings

COMPOSITION CONTAINING FURFURYL ALCOHOL AND USE THEREOF IN FOUNDRY BINDERS

DESCRIPTION

TECHNICAL FIELD

The present invention relates to binder compositions, methods for curing such binder compositions, and use thereof. The compositions of the present invention are especially useful as molding compositions, such as refractories, abrasive articles, and molding shapes, such as cores and molds. The binder compositions of the present invention are capable of being cured at normal room temperatures by an acidic curing agent incorporated into the binder.

BACKGROUND ART

In the foundry art, cores and molds for use in making metal castings are commonly prepared from mixtures of an aggregate material, such as sand, which has been combined with a bonding amount of a polymerizable or curable binder. Frequently, minor amounts of other materials are also included in these mixtures, e.g., iron oxide, ground flax fibers, powdered coal, clay, and the like. The binder permits such a foundry mix to be molded to shape into the desired form and thereafter cured to form a self-supporting structure.

Typically, sand is used as the aggregate material. After the sand and binder have been mixed, the resulting foundry sand mix is rammed, blown, or otherwise introduced into a pattern, thereby assuming the shape defined by the adjacent surfaces of the pattern. Then by the use of a catalyst and/or the use of heat, the polymerizable binders polymerize or cure, thereby converting the formed, uncured, plastic, foundry aggregate mix into a hard, solid, cured state. This hardening can be accomplished in the original pattern or in a holding pattern.

Certain of the prior art processes are quite effective. Unfortunately, the use of core oil binders (e.g., "baking binders"), which are cured by being subjected to elevated temperatures, e.g., from about 225° F. to about 500° F., requires that heating facilities be available. Frequently, it is necessary to keep the green cores in the original molds or patterns during this heating period, since many heat-curable binders do not impart sufficient green strength to cause green cores to retain their desired shape without external support until such time as a final cure can be effected. Likewise, binders which are cured by means of gaseous catalysts often require that gasing chambers be available. Additionally, many of the binders which can be gas cured suffer from the same green strength or stripping strength deficiencies as do the heat curable binders.

In an effort to prepare cores without the necessity for using heat, gaseous catalyst, and the like, various prior attempts have been made to prepare binders which would be capable of curing at room temperature, i.e. at temperatures of from about 45° to about 120° F., more usually about 60° to about 90° F. A variety of materials have been developed or suggested for use as binders, but these prior compositions have suffered from one or more deficiencies.

Among the better performing systems are those employing furfuryl alcohol, which can be polymerized to a furan polymer. The primary undesirable aspect of using furfuryl alcohol systems is that such are relatively expensive when compared to other foundry binder systems. Accordingly, much effort has gone into finding additives which would render the compositions less expensive. However, many such additives result in a significant sacrifice in the performance level of one or more important characteristics or properties of the composition. Discovering materials which can be used as inexpensive additives without significantly degrading important properties of the composition is, therefore, a continuing effort.

For instance, various furfuryl alcohol-furan binder compositions have been modified with aromatic polyester polyols as disclosed in copending application Ser. No. 887,087, now U.S. Pat. No. 4,215,206 to Hanesworth et al, and assigned to Ashland Oil, Inc., the assignee of the present application. The specific compositions employed therein, however, are not reactive at room temperature, and when the polyester polyols employed therein are used in no bake furan systems, the work time and strip time is much longer than desirable.

DISCLOSURE OF INVENTION

The present invention is concerned with a composition which contains furfuryl alcohol and an ester of a polyol and resin acid.

The incorporation of the ester results in an overall decrease in the total cost of the composition at current costs of the various ingredients present in the compositions without a concomitant significant deterioration of the strength characteristics. In certain preferred compositions, the presence of the ester actually results in significant improvement of the tensile strength characteristics of cured molding compositions containing the compositions of the present invention as binders when compared to systems containing other types of additives.

The present invention is also directed to molding binder compositions which contain the above composition in admixture with a curing agent, such as an acidic catalyst. The present invention is also directed to molding compositions which contain a major amount of aggregate and an effective bonding amount up to about 40% by weight of the aggregate of the above-identified binder composition in admixture with a curing agent, such as an acidic catalyst.

The present invention is also directed to a process for the fabrication of molded articles which includes the following steps:

(a) mixing foundry aggregate with a bonding amount of up to 40% by weight based upon the weight of the aggregate of a binder composition of the type described hereinabove, and an acidic catalyst;

(b) introducing the composition obtained from step (a) into a pattern;

(c) hardening the composition in the pattern to become self-supporting; and (d) thereafter removing the shaped article of step (c) from the pattern and allowing it to further cure, thereby obtaining a hard solid cured molded article.

The present invention is also concerned with a process for casting metal which includes fabricating a shape as described hereinabove, pouring metal while in the liquid state into or around the shape, allowing the metal to cool and solidify, and then separating the molded metal article.

BEST AND VARIOUS MODES FOR CARRYING OUT INVENTION

The esters employed according to the present invention must be esters from a polyol and a resin acid. The polyol employed preferably contains two or three hydroxyl groups and, most preferably, is a glycol. Examples of some suitable polyols for the esters employed according to the present invention are alkylene glycols, and polyalkylene glycols, such as ethylene glycol, diethylene glycol, polyethylene glycol, propylene glycol, and butylene glycol; and glycerol. Mixtures of polyols can be employed when desired. The resin acids employed according to the present invention can be of the abietic type and/or the pimeric type, but preferably are predominantly of the abietic type. It is understood that the term abietic-type acids include abietic acid, levopimaric acid, neoabietic acid, and the disproportionated abietic acids, such as dehydroabietic acid, and tetrahydroabietic acid. It is understood that the term pimeric-type acid includes dextropimeric acid and isodextropimeric acid. The resin acids can be employed in combination with various fatty carboxylic acids, such as those normally found in gum rosin, wood rosin, and tall oil rosin, and including $C_{18}$ acids, such as oleic acid, linoleic, linolenic and stearic acids.

The acids, however, should be at least 40% by weight resin acids, and of the resin acids being predominantly of the abietic type. The esters can be formed by esterification of the acids with the polyol or, preferably, by transesterification of the rosin esters (i.e. the neutral portion of the rosin) with the polyol. The neutral portion of the natural rosins are esters of the resin acids and fatty acids of the type discussed hereinabove and are usually the methyl esters. The polyol is generally employed in amounts so as to react with at least about 80% by weight and preferably with substantially all of the carbomethoxy groups present in the rosin esters or of the carboxy groups present in the acids. It is preferred to employ about a 10% stoichiometric excess of polyol per rosin ester or acid present.

The binder component employed in the present invention includes furfuryl alcohol. The furfuryl alcohol polymerizes for instance in the presence of acid catalyst to form a furan polymer. The furfuryl alcohol can be used alone or can be present with polymeric and/or monomeric modifying agents. For instance, the furfuryl alcohol can be used in combination with a furan polymer.

Examples of some suitable furan polymers include furfuryl alcohol aldehyde polymers (e.g. formaldehyde), urea-aldehyde-furfuryl polymers, and phenolic-aldehyde-furfuryl alcohol polymers. For instance, the furan polymers include reaction products of furfuryl alcohol and of aldehyde, such as formaldehyde. In addition, the aldehyde-furfuryl alcohol reaction product can be modified with varying amounts of reactants, such as phenolic compounds, urea, thiourea, melamine, dicyandiamide, and benzoguanamine. Examples of some suitable aldehydes include formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The phenols employed are generally all phenols which have heretofore been employed in the formation of phenolic resins and which are not substituted at either the two ortho-positions or at one ortho- and para-position, such unsubstituted positions being necessary for the polymerization reaction. Any one, all, or none of the remaining carbon atoms of the phenol ring can be substituted. The nature of the substituent can vary widely, and it is only necessary that the substituent not interfer in the polymerization of the aldehyde with the phenol at the ortho- and/or para-positions. Substituted phenols employed in the formation of the phenolic resins include: alkyl-substituted phenols, aryl-substituted phenols, cyclo-alkyl-substituted phenols, alkenyl-substituted phenols, alkoxy-substituted phenols, aryloxy-substituted phenols, hydroxy-substituted phenols, and halogen-substituted phenols, the foregoing substituents containing from 1 to 26 and preferably from 1 to 9, carbon atoms. Specific examples of suitable phenols include: phenol, resorcinol, 2,6 xylenol, o-cresol, m-cresol, p-cresol, 3,5-xylenol, 3,4-xylenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy penol, and p-phenoxy phenol. Such phenols can be described by the general formula:

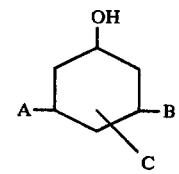

wherein A, B, and C are hydrogen, hydrocarbon radicals, oxyhydrocarbon radicals, halogen, or hydroxy. The mole ratios of aldehyde to furfuryl alcohol which can be employed can vary widely. For instance, the furan polymer can be prepared from about 0.4 to about 4 moles of furfuryl alcohol per mole of aldehyde, and preferably from about 0.5 to about 2 moles of furfuryl alcohol per mole of aldehyde.

The furan polymer which can be employed in the present invention can be any of the various furan polymers which are known to be suitable for foundry purposes. Examples of such furan polymers include those obtained from about 1 mole of phenol, about 0.2 to 2 moles of furfuryl alcohol, and about 1 to 3 moles of formaldehyde, such as described in U.S. Pat. No. 3,312,650. In addition, U.S. Pat. Nos. 3,222,315 and 3,247,556 describe various urea-modified furan resins which can be employed for the purposes of the present invention. The furan polymers are generally prepared by polymerization in the presence of an acid catalyst.

The furan resins can be prepared according to the procedure described in Australian Pat. No. 423,636, disclosure of which is incorporated herein by reference. These furan resins are prepared by partially polymerizing formaldehyde and furfuryl alcohol in the presence of an acid catalyst, arresting the polymerization at an intermediate stage by neutralizing the acid catalyst, to thereby form a furan prepolymer, and thereafter heating the prepolymer in the presence of a metal ion catalyst.

In particular, furfuryl alcohol, formaldehyde (e.g. such as formalin or paraformaldehyde), and an inert organic solvent (e.g. xylene) are charged to a reaction vessel. Then, the acid catalyst (e.g. phosphoric acid and paratoluene solphonic acid) is added to the reaction vessel and the resulting mixture is heated under reflux conditions and maintained under these conditions until the reaction has proceeded to the desired degree of polymerization. The water of reaction and any water present with any of the reactants is removed during polymerization, usually through a tap on the reflux condenser. The degree of polymerization can be followed by measuring the amount of water removed or by measuring the viscosity, refractive index, free formaldehyde content, and pH of the reaction mixture. When the desired degree of polymerization has been obtained, the acid catalyst will be neutralized to halt polymerization and a metal catalyst (e.g. lead oxide) will be added to the prepolymer after which it will be heated to distill out the organic solvent and to destroy the residual free formaldehyde. It has been noted that when the prepolymer is heated at a uniform rate (e.g. 1° to 3° F. per minute) in the presence of a metal ion catalyst, a point is reached (e.g. about 270° F.) when the temperature will spontaneously increase at a more rapid rate because of the extra heat being supplied to the system by the destruction of the residual free formaldehyde (which is an exothermic reaction). The prepolymer can then be cooled. Usually an alkaline material is added to adjust the pH of the polymer to about 6 to about 7.5. These furan prepolymers can be prepared in the presence of monomers which are copolymerizable with formaldehyde and furfuryl alcohol, such as phenol.

Formaldehyde can be used in any of its various forms (e.g. formalin, trioxane, and paraformaldehyde).

The reaction conditions which can be used to form the furan prepolymers are those conditions of temperature and pressure which favor the acid catalyzed polymerization of furfuryl alcohol with formaldehyde. The choice of a suitable acid catalyst is well within the skill of the art. Thus, pressure can be superatmospheric, subatmospheric, or atmospheric. Atmospheric pressure is generally acceptable. Temperature can vary widely, although reaction temperatures about 100° C. are preferred because of the desired reaction rates, which are obtained in the lower water contents which results from the use of higher temperatures.

The mole ratios of formaldehyde to furfuryl alcohol which can be employed can vary widely. Good results have been obtained from using about 0.6 to about 1.6 moles of formaldehyde per mole of furfuryl alcohol. A particularly useful group of polymers which can be made by using a mole ratio of formaldehyde to furfuryl alcohol are from 0.9 to 1.2 moles of formaldehyde per mole of furfuryl alcohol.

Examples of some monomeric modifying agents are those materials discussed hereinabove which are suitable for preparing prepolymerized furan resins employed according to the present invention such as phenolic compounds, aldehydes, and nitrogen-containing compounds, such as urea, thiourea, melamine, dicyandiamide, and benzoguanamine.

When a polymeric and/or polymerizable monomeric modifying agent is employed, the amount of such is generally about 1 to about 80%, and preferably about 2 to about 55%, and when said modifying agent is polymeric most preferably about 45 to about 55% by weight of the total of furfuryl alcohol and said modifying agent. Conversely, the amount of furfuryl alcohol is generally about 99 to about 20%, preferably about 98 to about 45%, and most preferably when said modifying agent is polymeric about 55 to about 45% by weight of the total of furfuryl alcohol and said modifying agent.

The preferred binders employed according to the present invention are obtained from mixtures of resorcinol and furfuryl alcohol or mixtures of furfuryl alcohol and urea-formaldehyde polymers. With respect to the monomeric mixtures of resorcinol and furfuryl alcohol employed, it is preferred that the resorcinol be present in the furfuryl alcohol-resorcinol mixture in an amount from about 2 to about 45% by weight, and most preferably from about 2 to about 20% by weight.

In addition, the composition, in order to result in a cured polymeric structure, must include a curing catalyst. The compositions of the present invention are preferably employed as no-bake and/or room temperature curable systems, since their use as hot box foundry systems has not been entirely satisfactory. For a no-bake system, a strong acid catalyst of the type having a pKa lower than 2.3 which is well known for polymerizing furfuryl alcohol polymers can be employed.

Examples of some suitable acid catalysts include inorganic acids, such as phosphoric acid, hydrochloric acid; and organic acids, such as the organic sulphonic acids, including benzene sulphonic acid, toluene sulphonic acid, xylene sulphonic acid, cumene sulphonic acid and cresol sulfonic acid. Mixtures of acids can be employed when desired.

The amount of acid catalyst employed is usually about 5 to about 75% by weight, and preferably about 20 to about 50% by weight based upon the total weight of the binder system (i.e. ester and binder component).

The amount of ester employed is usually at least about 5% by weight, preferably about 5 to 60% by weight, and most preferably about 10 to about 50% by weight of the total weight of ester and furfuryl alcohol-containing binder component. The furfuryl alcohol-containing binder component as discussed hereinabove can contain furfuryl alcohol per se or mixtures with monomeric and/or polymeric modifiers.

When preparing an ordinary sand-type foundry shape, the aggregate employed has a particle size large enough to permit sufficient porosity in the foundry shape to permit escape of volatiles from the shape during the casting operation. The term "ordinary sand-type foundry shapes" as used herein refers to foundry shapes which have sufficient porosity to permit escape of volatiles from it during the casting operation. Generally, at least about 80% and preferably about 90% by weight of aggregate employed for foundry shapes has an average particle size no smaller than about 150 mesh (Tyler screen mesh). The aggregate for foundry shapes preferably has an average particle size between about 50 and about 150 mesh (Tyler screen mesh). The preferred aggregate employed for ordinary foundry shapes is silica sand wherein at least about 70 weight percent, and preferably at least about 85 weight percent of the sand is silica. Other suitable aggregate materials include zircon, olivine, alumino-silicate sand, chromite sand and the like.

When preparing a shape for precision casting, the predominant portion, and generally at least about 80% of the aggregate, has an average particle size no larger than about 150 mesh (Tyler screen mesh), and preferably between 325 mesh and 200 mesh (Tyler screen mesh). Preferably at least about 90% by weight of the aggregate for precision casting applications has a particle size larger than 150 mesh and preferably between 325 mesh and 200 mesh. The preferred aggregates employed for precision casting applications are fused quartz, zircon sands, magnesium silicate sands such as olivine, and alumino-silicate sands.

Shapes for precision casting differ from ordinary sand-type foundry shapes in that the aggregate in shapes for precision casting can be more densely packed than the aggregate in shapes for ordinary sand-type foundry shapes. Therefore, shapes for precision casting must be heated before being utilized to drive off volatizable material present in the molding composition. If the volatiles are not removed from a precision casting shape before use, vapor created during casting will diffuse into the molten melt, since the shape has a relatively low porosity. The vapor diffusion would decrease the smoothness of the surface of the precision cast article.

When preparing a refractory, such as a ceramic, the predominant portion and at least about 80% by weight of the aggregate employed has an average particle size under 200 mesh and preferably no larger than 325 mesh. Preferably at least about 90% by weight of the aggregate for a refractory has an average particle size under 200 mesh, and preferably no larger than 325 mesh. The aggregate employed in the preparation of refractories must be capable of withstanding the curing temperatures, such as above about 1500° F. which are needed to cause sintering for utilization.

Examples of some suitable aggregate employed for preparing refractories include the ceramics, such as refractory oxides, carbides, nitrides, and silicides, such as aluminum oxide, lead oxide, chromic oxide, zirconium oxide, silica, silicon carbide, titanium nitride, boron nitride, molybdenum disilicide, and carbonaceous material, such as graphite. Mixtures of the aggregates can also be used, when desired, including mixtures of metals and the ceramics.

Examples of some abrasive grains for preparing abrasive articles include aluminum oxide, silicon carbide, boron carbide, corundum, garnet, emery and mixtures thereof. The grit size is of the usual grades as graded by the United States Bureau of Standards. These abrasive materials and their uses for particular jobs are understood by persons skilled in the art and are not altered in the abrasive articles contemplated by the present invention. In addition, inorganic filler can be employed along with the abrasive grit in preparing abrasive articles. It is preferred that at least about 85% of the inorganic fillers has an average particle size no greater than 200 mesh. It is most preferred that at least about 95% of the inorganic filler has an average particle size no greater than 200 mesh. Some inorganic fillers include cryolite, fluorospar, silica and the like. When an organic filler is employed along with the abrasive grit, it is generally present in amounts from about 1 to about 30% by weight based upon the combined weight of the abrasive grit and inorganic filler.

In molding compositions, the aggregate constitutes the major constituent and the binder constitutes a relatively minor amount. In ordinary sand type foundry applications, the amount of binder is generally no greater than about 10% by weight and frequently within the range of about 0.5 to about 7% by weight based upon the weight of the aggregate. Most often, the binder content ranges from about 0.6 to about 5% by weight based upon the weight of the aggregate in ordinary sand type foundry shapes.

In molds and cores for precision casting application the amount of binder is generally no greater than about 40% by weight and frequently within the range of about 5 to about 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

The molding mix is molded into the desired shape, whereupon it can be cured. Curing can be effected by the action of an acid catalyst previously incorporated into the mix.

A valuable additive to the binder compositions of the present invention in certain types of sand is a silane having the general formula:

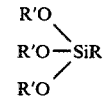

wherein R' is a hydrocarbon radical and preferably an alkyl radical of 1 to 6 carbon atoms and R is an alkyl radical, an alkoxy-substituted alkyl radical, or an alkylamine-substituted alkyl radical in which the alkyl groups have from 1 to 6 carbon atoms. The aforesaid silane when employed in concentrations of about 0.05 to 2% based on the binder component of the composition, improves the humidity resistance of the system.

Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta (amino-ethyl)-gamma aminopropyltrimethoxy silane); and Union Carbide A-1160 (Ureido-silane).

When the compositions of the present invention are used to prepare ordinary sand-type foundry shapes, the following steps are employed:

1. forming a foundry mix containing an aggregate (e.g. sand) and the contents of the binder system;
2. introducing the foundry mix into a mold or pattern to thereby obtain a green foundry shape;
3. allowing the green foundry shape to remain in the molded pattern for a time at least sufficient for the shape to obtain a minimum stripping strength, i.e. become self-supporting; and
4. thereafter removing the shape from the mold or pattern allowing it to cure at room temperature, thereby obtaining a hard solid cured foundry shape.

In order to further understand the present invention, the following non-limiting examples concerned with foundry are provided. All parts are by weight unless the contrary is stated. In all examples the foundry samples are cured by the so-called "no-bake" process.

EXAMPLE I (A) Preparation of Diethylene Glycol Modified Tall Oil Rosin Ester

About 1360 parts by weight of tall oil rosin are added to a reaction vessel and heated to about 100° C. About 0.5 parts by weight of oxalic acid is added to the rosin. The temperature is raised to about 180° C. after which about 234 parts by weight of diethylene glycol are added. The temperature of the reaction mass is then raised to about 260° C. and held at that temperature until the acid number reaches about 13-15. When the acid number reaches 13-15, a full vacuum is applied to the reaction mass with the temperature being maintained at a temperature greater than 250° C. for about 15 minutes. The reaction mass is then cooled down and the product obtained has an acid number of less than 12.

(B) Preparation of Diethylene Glycol Modified Gum Rosin Ester

A diethylene glycol modified gum rosin ester is prepared from about 680 parts by weight of gum rosin, about 115 parts by weight of diethylene glycol, and about 0.25 parts by weight of oxalic acid. The reaction is carried out at temperatures of about 265° C.-280° C. and is terminated at an acid value of about 10.

(C) Preparation of Propylene Glycol Modified Rosin Ester

A modified rosin ester is prepared from about 680 parts by weight of gum rosin, about 87.5 parts by weight of propylene glycol, and about 0.25 parts by weight of oxalic acid. The reaction is carried out at temperatures of about 265° C.-280° C. and is terminated at an acid value of about 10.

(D) Diethylene Glycol Modified DisProportionated Tall Oil Rosin Ester

A diethylene glycol modified disproportionated tall oil rosin ester is prepared by the above procedure from about 517 parts by weight of disproportionated tall oil rosin, about 92 parts by weight of diethylene glycol, and about 0.25 parts by weight of oxalic acid. The reaction is carried out a temperatures of about 265° C.-280° C. and is terminated at an acid value of 10.

EXAMPLE II

About 100 parts of Wedron 5010 silica sand and about 1.5 parts of a binder component obtained from about 66 parts by weight of furfuryl alcohol, about 29 parts by weight of the diethylene glycol tall oil ester prepared in accordance with the procedure of Example I(A) about 3 parts by weight of a urea-formaldehyde concentrate, containing about 60% by weight formaldehyde, about 25% by weight urea and about 15% by weight water, about 2 parts by weight of urea, and about 0.15 parts by weight of gamma aminopropyltriethoxy silane are admixed for about 2 minutes. To this mixture is added about 0.5 parts by weight of p-toluene sulphonic acid. The mixture is then agitated for about 2 minutes.

The resulting foundry mix is formed into a standard AFS tensile strength sample using the standard procedure. The test results are presented in Table I hereinbelow.

EXAMPLE III

Example II is repeated except that the diethylene glycol tall oil ester is replaced with equal parts by weight of Terate 203. Terate 203 is, according to the manufacturer, an aromatic polyester polyol typically having 9% hydroxyl content, less than about 1% methoxyl content, an acid number of 4.2, a moisture content of about 0.2%, free diethylene glycol content of about 9%, an average functionality of 2.3, and viscosities of 30,000 cps at 25° C., 7000 cps at 40° C., and 90 cps at 100° C. The terates are reported to be petroleum aromatic hydrocarbons produced in the production of dimethyl terephthalate and contain carboxymethoxy polyphenol and polycarbomethoxy diphenols in admixture with benzyl esters of the toluate family. The results obtained are shown in Table I hereinbelow.

EXAMPLE IV

About 100 parts by weight of Wedron 5010 silica sand are admixed with about 1.5 parts by weight of a binder mixture from about 85 parts by weight of furfuryl alcohol, about 10 parts by weight of the diethylene glycol tall oil ester prepared in accordance with the procedure of Example I(A), about 5 parts by weight of resorcinol, and about 0.15 parts by weight of gamma aminopropyltriethoxy silane are admixed for about 2 minutes. To this mixture is added about 0.5 parts by weight of p-toluene sulphonic acid, and the mixture is then agitated for about 2 minutes.

The resulting foundry mix is formed into standard AFS tensile strength samples using the standard procedure. The results obtained are shown in Table I hereinbelow.

EXAMPLE V

Example IV is repeated except that the diethylene glycol tall oil ester is replaced with equal parts by weight of Terate 203. The results obtained are reported hereinbelow in Table I.

TABLE I

| SAND TEST DATA | EXAMPLE II | EXAMPLE III | EXAMPLE IV | EXAMPLE V |
|---|---|---|---|---|
| Work Time (Min.) | 16 | 25 | 5 | 8 |
| Strip Time (Min.) | 21 | 70 | 12 | 14 |
| Tensile Strength (psi) | | | | |
| 2 Hours | 297(81)[a] | 140(71) | 232(73) | 215(74) |
| 4 Hours | 360(79) | 230(79) | — | — |
| 24 Hours | 367(79) | 302(75) | 283(74) | 316(76) |
| 24 + 1 Hours | 300(74) | 243(73) | 295(73) | 297(74) |
| Sag Test | ¼" | ¼" | | |

NOTES:
[a]Scratch Hardness

EXAMPLE VI

About 100 parts by weight of Wedron 5010 silica sand and about 1.5 parts by weight of a binder component from about 15 parts by weight of furfuryl alcohol, about 10 parts by weight of the propylene glycol—gum rosin ester obtained according to the procedure of Example I(C); about 5 parts by weight of resorcinol; and about 0.15 parts by weight of gamma aminopropyltriethoxy silane are admixed for about 2 minutes. To this mixture are added about 0.25 parts by weight of benzenesulphonic acid, and the mixture is agitated for about another 2 minutes.

The resulting foundry mix is formed into standard AFS tensile strength samples using the standard procedure. The results obtained are reported hereinbelow in Table II.

EXAMPLE VII

Example VI is repeated except that the propylene glycol—gum rosin ester is replaced with equal amounts by weight of the diethylene glycol modified disproportionated tall oil rosin ester obtained according to the procedure of Example I(D). The results obtained are reported hereinbelow in Table II.

EXAMPLE VIII

Example VI is repeated except that the propylene glycol—gum rosin ester is replaced with an equal amount of Terate 203. The results obtained are reported hereinbelow in Table II.

TABLE II

| SAND TEST DATA | EXAMPLE VI | EXAMPLE VII | EXAMPLE VIII |
|---|---|---|---|
| Work Time (Min.) | 10 | 9 | 12 |
| Strip Time (Min.) | 17 | 15 | 24 |
| Tensile Strength (psi) | | | |
| 1 Hour | 245 | 287 | 260 |
| 3 Hours | 350 | 330 | 375 |
| 24 Hours | 475 | 423 | 330 |
| 24 + 1 Hours | 400 | 240 | 215 |

EXAMPLE IX

About 100 parts by weight of Wedron 5010 silica sand and about 1.5 parts by weight of a binder component from about 66 parts by weight of furfuryl alcohol, about 29 parts by weight of the diethylene glycol modified gum rosin ester obtained according to the procedure of Example I(B), about 3 parts by weight of a urea-formaldehyde concentrate containing about 60% formaldehyde, about 25% urea, and about 15% water, about 2 parts by weight of urea, and about 0.15 parts by weight of gamma aminopropyltriethoxy silane are admixed for about 2 minutes. To this mixture is added about 0.45 parts by weight of p-toluene sulphonic acid, and the mixture is agitated for about 2 additional minutes.

The resulting foundry mix is formed into standard AFS tensile strength samples using the standard procedure. The results obtained are reported hereinbelow in Table III.

EXAMPLE X

Example IX is repeated except that the diethylene glycol modified gum rosin ester is replaced with equal parts by weight of propylene glycol modified gum rosin ester obtained according to the procedure of Example I(C). The results obtained are presented hereinbelow in Table III.

EXAMPLE XI

Example IX is repeated except that the diethylene glycol modified gum rosin ester is replaced with equal amounts by weight of the diethylene glycol modified disproportionated tall oil rosin ester obtained according to the procedure of Example I(D). The results obtained are presented hereinbelow in Table III.

EXAMPLE XII

Example IX is repeated except that the diethylene glycol modified gum rosin ester is replaced with equal parts by weight of the Terate 203. The results obtained are presented below in Table III.

TABLE III

| SAND TEST DATA | EXAMPLE IX | EXAMPLE X | EXAMPLE XI | EXAMPLE XII |
|---|---|---|---|---|
| Work Time (Min.) | 22 | 19 | 24 | 52 |
| Strip Time (Min.) | 30 | 29 | 32 | 90 |
| Tensile Strength (psi) | | | | |
| 1 Hour | 153 | 130 | 115 | 40 |
| 3 Hours | 280 | 380 | 280 | 197 |
| 24 Hours | 320 | 470 | 300 | 337 |
| 24 + 1 Hours | 243 | 290 | 207 | 190 |

A comparison of the examples of the present invention as compared to those employing Terate 203 illustrate a general trend of improved reaction characteristics (i.e. shorter work and strip times) and a general trend of improved tensile strength properties from practicing the present invention, eventhough, a few of the examples of the present invention do not possess improved tensile strength as compared to those employing Terate 203.

What is claimed is:

1. A composition containing a binder component comprising at least about 20 weight % furfuryl alcohol and an ester of a polyol and a resin acid in an amount of at least about 5% by weight based upon the total of said binder component and ester and a modifying agent for the furfuryl alcohol selected from the group of furan polymers, urea-formaldehyde polymers, or mixtures thereof.

2. The composition of claim 1 wherein said polyol contains 2 or 3 hydroxyl groups.

3. The composition of claim 1 wherein said polyol includes a glycol.

4. The composition of claim 1 wherein said polyol is selected from the group of alkylene glycols, polyalkylene glycols, glycerol, and mixtures thereof.

5. The composition of claim 1 wherein said glycol is selected from the group of ethylene glycol, diethylene glycol, polyethylene glycol, propylene glycol, butylene glycol, or mixtures thereof.

6. The composition of claim 1 wherein said resin acid includes an acid from the group of abietic acid, levopimaric acid, neoabietic acid, and disproportionated abietic acid.

7. The composition of claim 1 wherein said ester is obtained from reacting a polyol in an amount sufficient to react with at least about 80% by weight of all the carbomethoxy groups present in resin ester or of the carboxy groups present in the resin acid or of both.

8. The composition of claim 1 wherein said ester is obtained from employing about a 10% stoichiometric excess per resin ester or resin acid employed or both.

9. The composition of claim 1 wherein said modifying agent includes furan polymers.

10. The composition of claim 1 wherein said binder component contains furfuryl alcohol and a urea-formaldehyde polymer.

11. The composition of claim 1 wherein the amount of furfuryl alcohol is about 20 to about 99% by weight based upon the combined weight of the furfuryl alcohol and modifying agent.

12. The composition of claim 1 wherein the furfuryl alcohol is present in an amount of about 45 to about 98% by weight based upon the total of the furfuryl alcohol and modifying agent.

13. The composition of claim 1 which includes a silane.

14. The composition of claim 13 wherein silane is present in an amount from about 0.05 to about 2% by weight based upon the total of the binder component of the composition.

15. The composition of claim 1 wherein the amount of ester is about 5 to about 60% by weight based upon the total of said binder component and ester.

16. The composition of claim 1 wherein the ester is present in an amount of about 10 to about 50% by weight based upon the total of said ester and said binder component.

17. The composition of claim 1 which further includes an acid catalyst having a $pK_a$ lower than 2.3.

18. The composition of claim 17 wherein said catalyst is present in an amount from about 5 to about 75% by weight based upon the total weight of the ester and binder component of the composition.

19. The composition of claim 17 wherein said acid is present in an amount of about 20 to about 50% by weight based upon the total weight of said ester and said binder component.

20. A molding composition which comprises a major amount of aggregate and an effective bonding amount up to about 40% by weight of the aggregate of a binder composition containing a binder component comprising at least about 20 weight % furfuryl alcohol and an ester of a polyol and a resin acid in an amount of at least about 5% by weight based upon the total of said binder component and ester.

21. The molding composition of claim 20 wherein said aggregate is silica sand and the amount of binder composition is up to about 10% by weight.

22. The composition of claim 20 wherein the amount of binder composition is about 0.5 to about 7% by weight based upon the weight of the aggregate.

23. The composition of claim 20 wherein the amount of binder is from about 0.6 to about 5% by weight based upon the weight of the aggregate.

* * * * *